United States Patent [19]

Mitomo

[11] Patent Number: 4,851,205

[45] Date of Patent: Jul. 25, 1989

[54] ALPHA-SIALON POWDER AND PROCESS FOR ITS PRODUCTION

[75] Inventor: Mamoru Mitomo, Ibaraki, Japan

[73] Assignee: National Institute for Researches in Inorganic Materials, Ibaraki, Japan

[21] Appl. No.: 921,247

[22] Filed: Oct. 21, 1986

[30] Foreign Application Priority Data

Jan. 17, 1986 [JP] Japan .............................. 61-007395

[51] Int. Cl.$^4$ .............................................. C04B 35/58
[52] U.S. Cl. ........................................ 423/327; 501/98
[58] Field of Search ..................... 501/98, 97, 100; 423/327; 264/65, 66

[56] References Cited

U.S. PATENT DOCUMENTS

| | | | |
|---|---|---|---|
| 4,360,506 | 11/1982 | Paris et al. .................. | 501/100 X |
| 4,500,644 | 2/1985 | Winkelbauer et al. ............ | 501/98 |

FOREIGN PATENT DOCUMENTS

| | | | |
|---|---|---|---|
| 87888 | 9/1983 | European Pat. Off. ............ | 501/97 |
| 57-3769 | 1/1982 | Japan ................................ | 501/98 |
| 57-129873 | 8/1982 | Japan ................................ | 501/98 |
| 58-84914 | 5/1983 | Japan ................................ | 501/100 |
| 58-95608 | 6/1983 | Japan ................................ | 423/327 |
| 59-18106 | 1/1984 | Japan ................................ | 423/327 |
| 59-199580 | 11/1984 | Japan ................................ | 501/98 |
| 60-21864 | 2/1985 | Japan ................................ | 501/98 |
| 60-145902 | 8/1985 | Japan ................................ | 423/327 |
| 60-260410 | 12/1985 | Japan ................................ | 423/322 |
| 61-26567 | 2/1986 | Japan ................................ | 501/98 |

OTHER PUBLICATIONS

*Journal of Materials Science,* by Izumi (1984), 19, 3115–3120.
*Progress in Nitrogen Ceramics,* by Jack (1983).
Boskovic et al., *Powder Metallurgy Int.,* vol. 11, p. 169 (1979).
Mitomo et al., *J. of Ceramic Soc. of Japan,* vol. 93, p. 69 (1985).

*Primary Examiner*—William R. Dixon, Jr.
*Assistant Examiner*—Ann M. Knab
*Attorney, Agent, or Firm*—Oblon, Spivak, McClelland, Maier & Neustadt

[57] ABSTRACT

An α-SIALON powder composed essentially of α-SIALON having the formula $M_x(Si,Al)_{12}(O,N)_{16}$ wherein M is at least one element selected from the group consisting of Li, Mg, Ca, Mn, Y and lanthanide metals and $0 < x \leq 2$.

21 Claims, No Drawings

ALPHA-SIALON POWDER AND PROCESS FOR ITS PRODUCTION

BACKGROUND OF THE INVENTION

1. Field of the Invention

The present invention relates to an α-SIALON powder and a process for producing it. α-SIALON is a solid solution of an α-type silicon nitride represented by the general formula $M_x(Si,Al)_{12}(O,N)_{16}$ wherein M is at least one element selected from the group consisting of Li, Mg, Ca, Mn, Y and lanthanide metals and $0 < x \leq 2$. A sintered product of α-SIALON is durable at high temperatures and has high strength and hardness as well as excellent corrosion and abrasion resistance, and thus it is expected as a prospective ceramic useful for applications to mechanical parts required to have heat resistance and abrasion resistance, such as cutting tools, drawing dies or mechanical seals.

2. Description of the Prior Art

An α-SIALON sintered product has been produced by molding a powder mixture comprising $Si_3N_4$, AlN and an oxide of M metal (wherein M is as defined above), followed by heating at a temperature of from 1700° to 1800° C.

However, according to this method, three different types of powders are used as starting materials, and the mixing and molding tend to be non-uniform. Consequently, the sintered product is likely to be non-uniform. Thus, it has been difficult to improve the strength or hardness. Besides, the method has a difficulty that is is thereby hardly possible to obtain a powder, since a chemical reaction of the starting materials takes place at the same time as the sintering.

SUMMARY OF THE INVENTION

The present invention has been made to solve the problems in the conventional method. It is an object of the present invention to provide an α-SIALON powder which used to be impossible to obtain and a process for its production. Specifically, it is an object of the present invention to readily produce a uniform α-SIALON sintered product having high strength.

The present inventors have conducted extensive researches to accomplish the above object, and as a result, have found it possible to readily produce an α-SIALON powder which used to be impossible to obtain according to the conventional method, by heating a uniform powder mixture of the starting materials in a nitrogen stream at a temperature of from 1400° to 17000° C. The present invention has been accomplished on the basis of this discovery.

Thus, the present invention provides an α-SIALON powder composed essentially of α-SIALON having the formula $M_x(Si,Al)_{12}(O,N)_{16}$ wherein M is at least one element selected from the group consisting of Li, Mg, Ca, Mn, Y and lanthanide metals and $0 < x \leq 2$.

Further, the present invention provides a process for producing such an α-SIALON powder, which comprises heating a mixture comprising silicon oxide or a silicon compound capable of forming silicon oxide when heated, aluminum oxide or an aluminum compound capable of forming aluminum oxide when heated, carbon, and an oxide or M or a compound of M capable of forming the oxide of M, in a nitrogen atmosphere at a temperature of from 1400° to 1700° C.

DETAILED DESCRIPTION OF THE PREFERRED EMBODIMENTS

The following methods may be mentioned as examples for the preparation of a powder mixture of starting materials:

(1) A method wherein silica, alumina, carbon and at least one member selected from the group consisting of oxides of M metals (i.e. Li, Mg, Ca, Mn, Y and lanthanide metals) and compounds capable of forming oxides of M metals when heated, such as carbonates, hydroxides and oxalates of M metals, are mechanically mixed.

(2) A method wherein colloidal silica and colloidal alumina are dispersed in a liquid in the form of fine sol, then carbon and a M metal oxide or a compound capable of forming a M metal oxide when heated, are dispersed in the sol and gelated, and then the liquid is removed to obtain a mixture.

(3) A method wherein solutions of a silicon compound, e.g. a silicon alkoxide such as methyl silicate or ethyl slicate, or sodium silicate; an aluminum compound e.g. al aluminum alkoxide such as aluminum ethoxide or aluminum propoxide, or an aluminum salt such as aluminum nitrate, aluminum sulfate, aluminum chloride or alum; and a M metal compound e.g. a M metal sulfate, chloride, nitrate or alkoxide, are prepared, carbon is dispersed in one of the solutions, then the rest of solutions were added thereto to form precipitates, and the liquid is separated from the precipitates.

However, the mixing method is not restricted to such specific methods, and any method may be employed so long as fine powders can thereby be uniformly mixed.

Among the above methods, the uniformity is better in the order of (1)→(2)→(3), whereby the heating temperature for the synthesis tends to be low. Namely, with the mixture obtained by the method (1), the heating temperatures for synthesis is from 1550° to 1700° C. Whereas, with the one obtained by the method (2), the heating temperature may be from 1450° to 1650° C., and with the one obtained by the method (3), the heating temperature may be from 1400° to 1600° C. If the heating temperature is lower than 1400° C., the reduction and nitriding reaction or the solid solution-forming rate tends to be slow, and the time for the synthesis tends to be long. On the other hand, if the heating temperature exceeds 1700° C., the evaporation of the starting materials tends to be substantial, whereby the yield tends to decrease. Therefore, the heating temperature is suitable from 1400° to 1700° C. The time for sintering is usually from 0.5 to 40 hours. The lower the temperature, the longer the sintering time. Namely, at a temperature of 1500° C., the sintering time will be from 8 to 16 hours. Whereas, at 1600° C., the sintering time will be from 2 to 6 hours.

The atomic ratio of Al/Si in the mixture of starting materials is preferably within a range of from 0.025 to 0.5. If the atomic ratio is less than 0.025, the product will be silicon nitride, and α-SIALON is hardly obtainable. On the other hand, if the atomic ratio exceeds 0.5, aluminum nitride and β-SIALON tend to form, whereby α-SIALON tends to be hardly obtainable.

The atomic ratio of a monovalent metal of M to Al (Li/Al) is preferably from 0.57 to 0.77. Likewise, the atomic ratio of a divalent metal of M to Al (Mg/Al or Ca/AL) is preferably from 0.23 to 0.43, and the atomic ratio of a trivalent metal of M to Al (Mn/Al, Y/Al or Ln/Al) is preferably from 0.12 to 0.32. If the atomic ratio is outside the above ranges, the content of α-SIA- LON will be less than 5% by weight, and when made into a sintered product, the merits of α-SIALON will not adequately be obtained. When the mixture of starting materials is heated in a nitrogen stream at a temperature of from 1400° to 1700° C., formation of solid solution takes place simultaneously with the substitution of nitrogen for oxygen. For example, in the case of a divalent metal, by the reaction represented by the following formula:

$$2MO + 3Al_2O_3 + 42SiO_2 + 93C + 62N_2 \rightarrow$$

$$4M_{0.5}(Si_{10.5}, Al_{1.5})(O_{0.5}, N_{15.5}) + 93CO \qquad (1)$$

simultaneously with the reduction and nitriding, M penetrates inbetween lattices to form a interstitial solid solution, and Al is substituted for Si and O is substituted for N to form a substitutional solid solution. In this case, if only Al and O are solid-solubilized, the product will be β-SIALON i.e. a solid solution of β-type silicon nitride. However, when other metals are dissolved into interstitial sites, the product will be α-SIALON i.e. a solid solution of α-type silicon nitride.

Carbon powder is required for the reduction and nitriding of silica and alumina. The number (x) of carbon atoms required to complete the reaction of the formula (1) is represented by the formula:

$$x = 2m + 1.5n \qquad (2)$$

where m is the number of silicon atoms and n is the number of aluminum atoms. In the actual reaction, the carbon is required to be in an amount of from 1 to 5 times, preferably from 1.5 to 3 times, the amount represented by the formula (2). If the amount is less than this range, the reaction will not be completed, and if the amount exceeds 5 times, it takes a long time for decarbonization treatment after the reaction, and silicon carbide tends to form so much that the sintering properties of the powder tend to deteriorate, such being undesirable.

The particle size of the powder thus obtained, is as fine as from 0.1 to 2 μm. The powder will be composed of a single phase of α-SIALON, or an α-SIALON phase containing silicon nitride, β-SIALON, silicon carbide, aluminum nitride, silica, alumina or a M metal oxide.

Now, the present invention will be described in further detail with reference to Examples. However, it should be understood that the present invention is by no means restricted to these specific Examples.

EXAMPLE 1

Silica (purity: 99.9%, average particle size: 0.3 μm), alumina (purity: 99.99%, average particle size: 0.5 μm), calcium carbonate (purity: 99.5%) and carbon black (average particles size: 0.05 μm) were mixed in a molar ratio of 88 : 6 : 3 : 300 in a ball mill made of silicon nitride. About 1.5 g of this mixture was molded into a pellet in a die having a diameter of 15 mm under a pressure of 300 kg/cm². The pellet was placed in a boat made of high purity alumina and heated in a nitrogen stream at 1550° C. for 5 hours in a high purity alumina furnace tube.

The powder thus obtained was heated in air at 600° C. for 1 hour to remove the remaining carbon. From the X-ray diffraction, this powder was found to contain 74% by weight of α-SIALON and the rest being β-$Si_3N_4$, β-SiC and AlN. The average particle size of the powder was 1.8 μm.

EXAMPLES 2 TO 4

α-SIALON powders were obtained in the same manner as in Example 1 by using the starting materials as identified in Table 1. The crystal substances in the resulting powders and the average particle sizes of the powders are also shown in Table 1.

TABLE 1

| | Starting materials (molar ratio) | | | | Formed powder | | |
|---|---|---|---|---|---|---|---|
| Example | Silica | Alumina | M metal oxide | Carbon | α-SIALON (wt. %) | Other substances | Average particle size (μm) |
| 2 | 100 | 8 | 2 ($Y_2O_3$) | 350 | 72 | β-$Si_3N_4$ | 1.6 |
| 3 | 41 | 4 | 2 (MgO) | 270 | 54 | β-$Si_3N_4$ AlN SiC (2H) | 1.2 |
| 4 | 62 | 10 | 2 ($Er_2O_3$) | 450 | 67 | β-SIALON AlN β-SiC | 1.7 |

EXAMPLE 5

Into 200 g of a colloidal silica solution containing 30% by weight of silica dispersed, 4.5 g of yttria, 0.74 g of lithium carbonate and 54 g of carbon black, were dispersed by ultrasonic vibration. To this dispersion, 46 g of a colloidal alumina solution containing 20% by weight of alumina dispersed, was added. After mixing, 50 g of a 10% hydrochloric acid aqueous solution was added thereto, and the mixture was subjected to centrifugal separation to obtain precipitates. The precipitates were dried, and heated in the same manner as in Example 1 at 1500° C. for 12 hours to obtain a powder.

The powder thus obtained was heated at 600° C. for 1 hour to remove the remaining carbon, whereby a powder comprising 88% by weight of α-SIALON and the rest being β-$Si_3N_4$ and small amounts of β-SiC and AlN, was obtained. The average particle size of the powder was 1.2 μm.

EXAMPLE 6

31 g of ethyl silicate and 2.2 g of ethoxy yttrium, were dissolved in 100 cc of isopropanol, and 5.4 g of carbon black was dispersed by the application of ultrasonic vibration. 19 g of aluminum nitrate (nonahydrate) was dissolved in 100 cc of distilled water, and then, gradually added to the above-mentioned solution. This solution mixture was heated at 80° C. for 5 hours to complete the formation of precipitates. Then, the pressure was reduced to 200 mmHg, and the system was heated to 80° C. to remove the liquid.

The precipitates thus obtained were heated and dried in air at 90° C. for 10 hours, followed by the same treatment as in Example 1 to obtain an α-SIALON powder. The reaction was conducted at 1500° C. for 12 hours.

The powder was heated in air at 600° C. for 1 hour to remove the remaining carbon, whereby an α-SIALON powder was obtained.

This powder contained 96% by weight of α-SIALON and the rest being $Si_3N_4 \cdot Y_2O_3$. The average particle size of the powder was 0.6 μm.

EXAMPLES 7 AND 8

26 g of ethyl silicate was dissolved in 100 cc of isopropanol, and a prescribed amount of carbon black was dispersed thereinto. Then, 150 g of an aqueous solution having an aluminum compound and a metal salt dissolved, was added thereto, followed by the same treatment as in Example 6 to obtain precipitates. The types and amounts of the aluminum compound and the metal salt as starting materials, and the amount of carbon and the conditions for synthesis, were as shown in Table 2. The obtained powders were as identified in Table 2.

TABLE 2

| Example | Starting materials (g) Aluminum compound | Metal salt | Carbon | Conditions for synthesis Temp. (°C.) | Time (hr) | Formed properties α-SIALON | Other substances | Average particle size (μm) |
|---|---|---|---|---|---|---|---|---|
| 7 | 8.7 Aluminum chloride (hexahydrate) | 3.3 Neodymium nitrate | 2.3 | 1450 | 36 | 92 | $\beta$-$Si_3N_4$ AlN | 0.4 |
| 8 | 11.8 Aluminum sulfate (octadecahydrate) | 4.0 Dysprosium chloride (hexahydrate) | 4.9 | 1530 | 4 | 95 | $\beta$-$Si_3N_4$ | 0.9 |

The present invention provides an α-SIALON powder which has never been obtained. A shaped product can readily be obtained from this powder by e.g. injection molding or slip casting. Accordingly, the present invention provides excellent effects that a sintered product obtained from the powder as a starting material has a uniform composition and high strength.

What is claimed is:

1. An α-SIALON powder consisting essentially of α-SIALON having the formula $M_x(Si,Al)_{12}(O,N)_{16}$, wherein M is at least one element selected from the group consisting of Li, Mg, Ca, Mn, Y and lanthanide metals, and $0 < x \leq 2$; wherein said α-SIALON powder is produced by a process comprising heating a mixture comprising silicon oxide or a silicon compound capable of forming silicon oxide when heated, aluminum oxide or an aluminum compound capable of forming aluminum oxide when heated, carbon, and an oxide of M or a compound of M capable of forming the oxide of M, in a nitrogen atmosphere at a temperature of from 1400° to 1700° C.; and wherein in said mixture, the atomic ratio of Al/Si is from about 0.025 to 0.5, the atomic ratio of M/Al is from about 0.12 to 0.77, and wherein said carbon is in an amount of from 1 to 5 times the sum of 2 times the number of Si atoms and 1.5 times the number of Al atoms.

2. The α-SIALON powder according to claim 1, wherein said silicon compound capable of forming silicon oxide when heated is selected from the group consisting of methyl silicate, ethyl silicate and sodium silicate.

3. The α-SIALON powder according to claim 1, wherein said aluminum compound capable of forming aluminum oxide when heated is selected from the group consisting of aluminum ethoxide, alumum propoxide, aluminum nitrate, aluminum sulfate, aluminum chloride and alum.

4. The α-SIALON powder according to claim 1, wherein said M metal compound is selected from the group consisting of a M metal sulfate, chloride, nitrate, lower alkoxide, carbonate, hydroxide and oxalate.

5. The α-SIALON powder according to claim 1, wherein said oxide of metal M or compound of metal M capable of forming the oxide of metal M is selected from the group consisting of yttrium oxide, magnesium oxide, erbium oxide, neodymium nitrate and dysprosium chloride hexahydrate.

6. The α-SIALON powder according to claim 1, wherein in said mixture, the atomic ratio of a monovalent metal M to Al is about 0.57 to 0.77, the atomic ratio of divalent metal M to Al is about 0.23 to 0.43, and the atomic ratio of trivalent metal M to Al is about 0.12 to 0.32.

7. The α-SIALON powder according to claim 1, wherein said powder has a particle size in the range of from 0.1–2 μm.

8. The α-SIALON powder according to claim 1, wherein said powder has a single phase of α-SIALON or an α-SIALON phase containing silicon nitride, β-SIALON, silicon carbide, aluminum nitride, silica, alumina or a M metal oxide.

9. The α-SIALON powder according to claim 1, wherein said powder contains at least 67% by wt. of said α-SIALON phase.

10. The α-SIALON powder according to claim 1, wherein said powder contains at least 92% by wt. of said α-SIALON phase.

11. The α-SIALON powder according to claim 1, wherein said lanthanide metal is neodymium or dysprosium.

12. A process for producing an α-SIALON powder consisting essentially of α-SIALON having the formula $M_x(Si,Al)_2(O,N)_{16}$ where M is at least one element selected from the group consisting of Li, Mg, Ca, Mn, Y and lanthanide metals and $0 < x \leq 2$, which comprises heating a mixture comprising silicon oxide or a silicon compound capable of forming silicon oxide when heated, aluminum oxide or an aluminum compound capable of forming aluminum oxide when heated, carbon, and an oxide of M or a compound of M capable of forming the oxide of M, in a nitrogen atmosphere at a temperature of from 1400° to 1700° C.; and wherein in said mixture, the atomic ratio of Al/Si is from about 0.025 to 0.5, the atomic ratio of M/Al is from about 0.12 to 0.77, and wherein said carbon is in an amount of from 1 to 5 times the sum of 2 times the number of Si atoms and 1.5 times the number of Al atoms.

13. The process of claim 12, wherein said mixture is obtained by dispersing carbon and an oxide of M or a compound of M capable of forming an oxide of M when heated, in a sol of silica and alumina and then separating the liquid.

14. The process of claim 12, wherein said mixture is obtained by dispersing carbon in a solution comprising a silicon compound capable of forming silica when heated, an aluminum compound capable of forming alumina when heated and a compound of M capable of forming an oxide of M when heated, and then reacting the solution.

15. The process of claim 13, wherein said heating is effected at a temperature of about 1450°–1650° C.

16. The process of claim 14, wherein said heating is effected at a temperature of about 1400°–1600° C.

17. The process of claim 12, wherein said oxide of-metal M or compound of metal M capable of forming the oxide of metal M is selected from the group consisting of yttrium oxide, magnesium oxide, erbium oxide, neodymium nitrate and dysprosium chloride hexahydrate.

18. The process of claim 12, wherein said silicon compound capable of forming silicon oxide when heated is selected from the group consisting of methyl silicate, ethyl silicate and sodium silicate.

19. The process of claim 12, wherein said aluminum compound capable of forming an aluminum oxide when heated is selected from the group consisting of aluminum ethoxide, aluminum propoxide, aluminum nitrate, aluminum sulfate, aluminum chloride and alum.

20. The process of claim 12 wherein said compound of M is selected from the group consisting of a M metal sulfate, chloride, nitrate, lower alkoxide, carbonate, hydroxide and oxalate.

21. The process of claim 12, wherein in said mixture, the atomic ratio of a monovalent metal M to Al is about 0.57 to 0.77, the atomic ratio of divalent metal M to Al is about 0.23 to 0.43, and the atomic ratio of trivalent metal M to Al is about 0.12 to 0.32.

* * * * *